Patented Aug. 5, 1924.

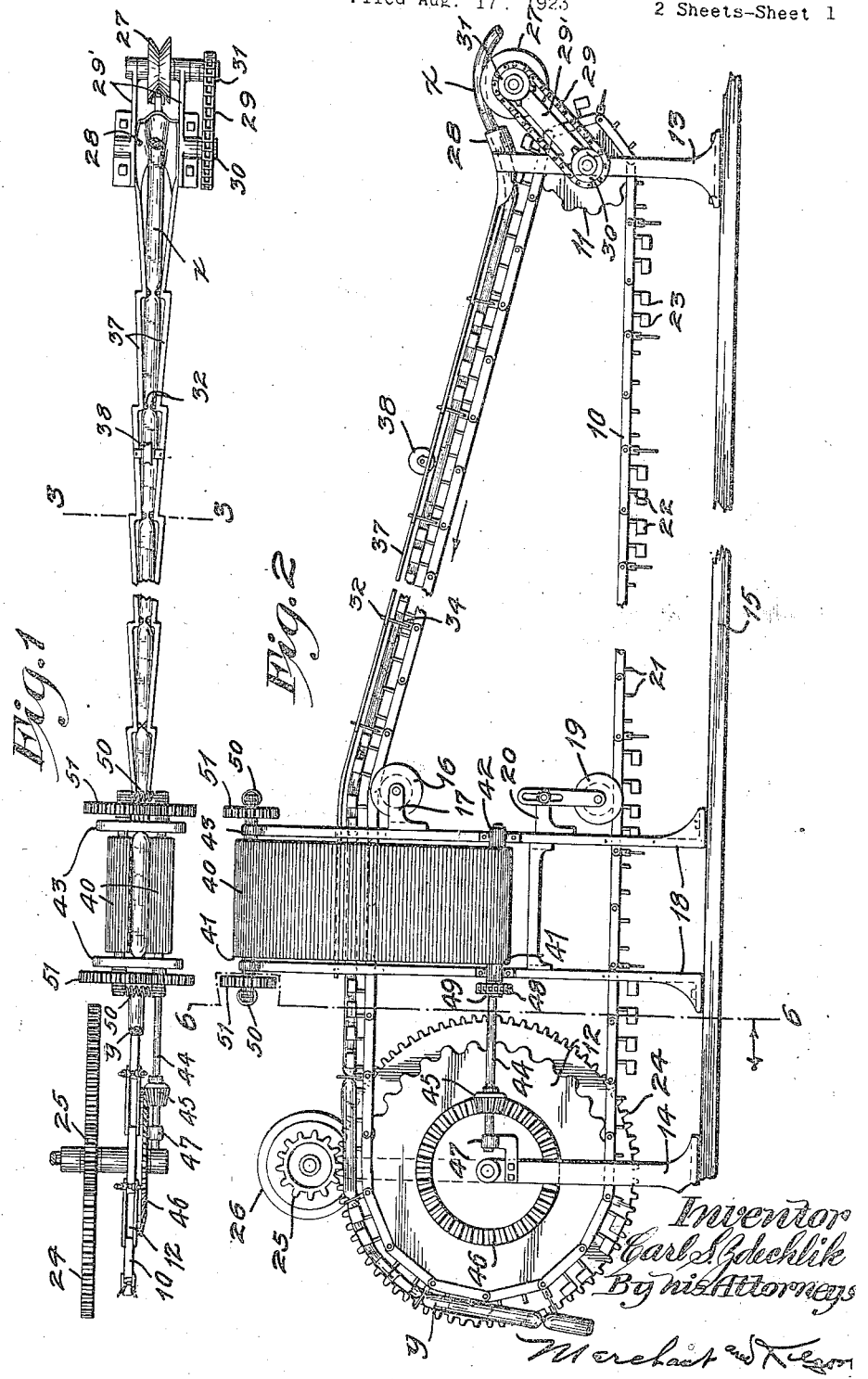

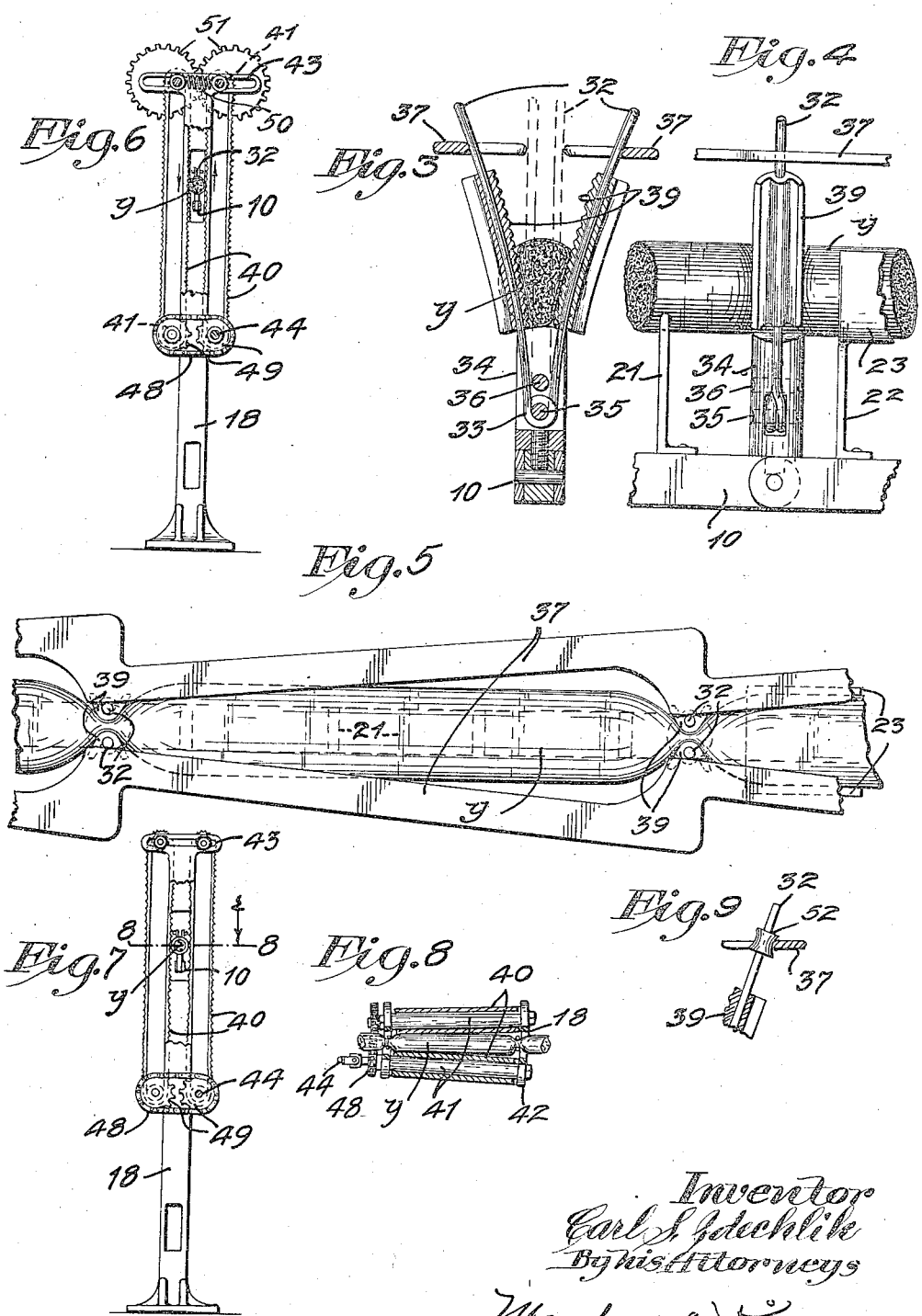

1,504,010

UNITED STATES PATENT OFFICE.

CARL S. ZDECHLIK, OF MINNEAPOLIS, MINNESOTA.

SAUSAGE-LINK-FORMING MACHINE.

Application filed August 17, 1923. Serial No. 657,883.

*To all whom it may concern:*

Be it known that I, CARL S. ZDECHLIK, a citizen of the United States, residing at Minneapolis, in the county of Hennepin and State of Minnesota, have invented certain new and useful Improvements in Sausage-Link-Forming Machines; and I do hereby declare the following to be a full, clear, and exact description of the invention, such as will enable others skilled in the art to which it appertains to make and use the same.

My invention relates to sausage machines, and more particularly to such machines for forming a filled sausage casing into links.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary plan view of the machine;

Fig. 2 is a left side elevation of the same;

Fig. 3 is a detail view principally in transverse section taken on the line 3—3 of Fig. 1, on an enlarged scale;

Fig. 4 is a side elevation of the parts shown in Fig. 3;

Fig. 5 is a fragmentary plan view of a filled sausage casing and squeezers;

Fig. 6 is a view principally in elevation, with some parts sectioned on the line 6—6 of Fig. 2;

Fig. 7 is a view corresponding to Fig. 6, but showing a slight modification;

Fig. 8 is a horizontal section taken on the line 8—8 of Fig. 7; and

Fig. 9 is a fragmentary detail view showing one of the squeezer prongs equipped with an anti-friction roller.

The numeral 10 indicates a carrier which, as shown, is in the form of an endless sprocket chain arranged to travel in a vertical plane and is mounted to run over a relatively small idle sprocket wheel 11 at the front of the machine and a relatively large driven sprocket wheel 12 at the rear of the machine. The sprocket wheels 11 and 12 are journaled in bearings on pedestals 13 and 14, respectively, secured to a base 15. An upper guide roller 16 for the chain 10 is journaled on a bracket 17 secured to an upright frame 18 on the base 15 between the two pedestals 13 and 14. This guide roller 16 is operative on the upper section of the chain 10 and supports the feed end portion thereof in an upwardly inclined position and the receiving end portion thereof in a horizontal position. A tightener for the chain 10 in the form of a flanged roller 19 is journaled on an adjustable bracket 20 secured to the frame 18 below the guide roller 16.

For supporting a filled sausage casing $x$ on the chain 10, there is secured thereto groups of longitudinally spaced holders 21 and 22 alternately arranged. These holders 21 and 22 project outward in the plane in which the chain 10 travels, and the outer ends thereof are made concave transversely of said chain to hold the casing $x$ thereon. The holders 22 are further provided with substantially segmental guard flanges 23 that cover the sides of the casing $x$ for a purpose that will presently appear.

To drive the sprocket 12 and hence the chain 10 at the desired speed, there is secured to its shaft a large gear 24 which meshes with a pinion 25 on the armature shaft of an electric motor 26. The filled sausage casing $x$ is fed onto the holders 21 and 22 by a grooved wheel 27 onto which said casing is laid by hand or otherwise. From the wheel 27 the casing slides over a concave apron 28 to the holders 21 and 22, and which apron is secured to the pedestal 13. The feed wheel 27 is journaled on arms 29' formed with the pedestal 13 and is driven by a sprocket chain 29 arranged to run over sprocket wheels 30 and 31 on the shaft of the sprocket wheel 11 and the wheel 27, respectively.

To form the filled casing $x$ into links during the travel of the chain 10 there is provided a plurality of longitudinally spaced squeezers carried by the chain 10, and each comprising a pair of prongs 32 between which the filled sausage casing $x$ extends longitudinally. Each pair of squeezer prongs 32 is formed from a single heavy spring wire intermediately coiled to form a spring 33 and then extended so as to extend in diverging relation transversely of the chain 10 and in the same direction as the holders 21 and 22. To attach the squeezer prongs 32 in position there is rigidly secured to certain links of the chain 10, posts 34 that are bifurcated transversely of the chain 10 to receive said prongs and which prongs are secured thereto by pins 35 which extend through the coiled springs 33. Other pins 36 are secured to the posts 34 and project between the squeezer prongs 32. The squeezer prongs 32 are gradually closed onto the sides of the casing $x$ and then released a plurality of times in succession by a plurality of pairs of cam bars 37 which extend from the apron 28 to the frame 18, and are carried thereby. The end portions of the prongs 32 extend between the pairs of cam bars 37 and are acted on by the opposing cam surfaces of said bars.

The cam bars 37 are in converging relation in respect to the direction of travel of the chain 10 which is indicated by the arrow marked on Fig. 2. It is important to note by reference to Fig. 1 that the cam bars 37 of each pair are progressively set closer together in the direction of travel of the chain 10 so as to progressively increase the squeezing action of the squeezer prongs 32 on the casing $x$ to form the same into links $y$. A guide roller 38, journaled in bearings on certain of the cam bars 37, holds the filled sausage casing $x$ on the holders 21 and 22 after leaving the apron 28.

The action of the squeezing prongs 32 on the filled sausage casing $z$ is such that the first pair of cam bars 37, acting on the prongs 32 passing therebetween during the travel of the chain 10, causes the same to produce only a slight squeezing action on said casing to displace the filling in said casing in both directions longitudinally in the casing. The next pair of cam bars 37 slightly increases the squeezing action of the prongs 32 to displace more of the filler, and so on until the last pair of cam bars 37 cause the prong 32 to press the sides of the casing substantially together and displace all of the filler therebetween, to permit the links to be twisted to complete the formation thereof. By thus gradually pressing the sides of the casing $x$ together to displace the filler between the links, all danger of cutting or breaking the casing $x$ is eliminated. To further prevent the casing $x$ from being cut or broken by the squeezing prongs 32, I provide said prongs with facing plates 39 having longitudinal bores through which said prongs project. The opposing surfaces of the facing plates 39 are segmental in cross section and corrugated to increase the friction thereof when engaging the wet sausage casing.

To twist the links $y$ to complete the formation thereof after the sides thereof have been squeezed together by the prongs 32, I provide a pair of opposing endless belts 40 arranged to travel in reverse directions in vertical planes. These belts 40 are located one on each side of the upper section of the chain 10 for action on the links $y$. Preferably the belts 40 are made from a material having a friction surface such as rubber, or rubber faced and transversely corrugated, as shown.

The belts 40 are each mounted to travel on upper and lower rollers 41 equipped with trunnions, the lower of which are journaled in fixed bearings 42 on the frame 18. The upper trunnions are journaled in slot-like bearings 43 in the frame 18 to permit lateral swinging movement of the belts 40 toward and from each other. To positively drive one of the belts 40, one of the trunnions of one of the lower rollers 41 is extended to afford a shaft 44 having a bevel pinion 45 which meshes with a bevel gear 46 on the shaft of the sprocket wheel 12. The outer end of the shaft 44 is journaled in a bearing 47 on the pedestal 14. The other belt 40 is driven from the shaft 44 in a reverse direction from the positively driven belt 40 by a sprocket chain 48 arranged to run over aligned sprocket wheels 49 on the trunnions of the lower rollers 41. The upper rollers are yieldingly drawn together by coiled springs 50 anchored to the trunnions of said rollers.

To cause the belts 40 to intermittently move apart on the trunnions of the lower rollers 41 and to move toward each other under the action of the spring 50 so as to twist alternate links $y$, to-wit: the ones on the holders 21, there is secured to the trunnions of the upper rollers 41 intermeshing eccentric gears 51. The chain 10 and elements carried thereby move through apertures in the frames 18. In addition to intermittently moving the belts 40 apart so as to not act on the links $y$ on the holders 22, the guards 23 further prevent said belts from acting on the respective links.

In the structure shown in Figs. 7 and 8, the eccentric gears 51 are dispensed with and the belts 40 are set in transversely converging relation in the direction of the travel of the chain 10 so that belts 40 act on the links $y$ at only one of their longitudinal edge portions, and said links are free to travel between said belts with a slipping action. In this arrangement of the belts 40, the guards 23 render said belts inoperative on the links $y$ within said guards.

To reduce the friction between the squeezer prongs 32 and cam bars 37, said prongs 32 may be provided with anti-friction rollers 52 arranged to travel on the inner edges of said bars with freedom to move longitudinally in said prongs, see Fig. 9.

During the operation of the machine, filled sausage casings are fed by hand or otherwise to the feed wheel 27 which, in turn, delivers the same over the apron and onto the holders 21 and 22 on the chain 10 which carries the same to the squeezer prongs 32. During the travel of the casing $x$ to the twisting belts 40, the same is acted upon by the squeezer prongs 32 to form the link $y$ as previously described. From the twisting belts 40, the formed links y are delivered by the chain 10 over the sprocket wheel 12 and into a receptacle or onto a holder.

What I claim is:

1. The combination with a carrier, of squeezers operative on a filled sausage casing to form links, said squeezers being operative to progressively increase the squeezing action on the sausage casing.

2. The combination with a carrier, of squeezers operative on a filled sausage casing to form links, said squeezers being operative to progressively increase the squeezing action on the sausage casing, and twisters operative on the links.

3. The combination with a carrier, of squeezers operative on a filled sausage casing to form links, and a pair of opposing reversely moving belts operative on the links for twisting the same, the opposing faces of the belts being in transversely converging relation in respect to the travel of the carrier.

4. The combination with a carrier for a filled sausage casing, of longitudinally spaced pairs of squeezing prongs on the carrier arranged for action on the casing to form links, means operative on said prongs to progressively increase the squeezing action thereof on the the casing, and twisters operative on the links.

5. The structure defined in claim 4 in which the squeezing prongs of each pair are under yielding strain to separate.

6. The combination with a carrier for a filled sausage casing, of longitudinally spaced pairs of squeezing prongs on the carrier arranged for action on the casing to form links, cams operative on said prongs to progressively increase the squeezing action thereof on the casing, and twisters operative on the links.

7. The combination with a carrier for a filled sausage casing, of longitudinally spaced pairs of squeezing prongs on the carrier arranged for action on the casing to form links, and pairs of cams in tandem arrangement for action on the squeezing prongs, said cams of each pair being in converging relation in the direction of the travel of the carrier.

8. The combination with a carrier for a filled sausage casing, of longitudinally spaced pairs of squeezing prongs on the carrier arranged for action on the casing to form links, and pairs of cams in tandem arrangement for action on the squeezing prongs, said cams of each pair being in converging relation in the direction of the travel of the carrier, said pairs of cams being arranged to cause said prongs to progressively increase the squeezing action on the casing.

9. The combination with a carrier for a filled sausage casing, of longitudinally spaced pairs of squeezing prongs on the carrier arranged for action on the casing to form links, means operative on said prongs to progressively increase the squeezing action thereof on the casing, twisters operative on the links, and facings applied to said prongs.

10. The combination with a carrier for a filled sausage casing, of longitudinally spaced pairs of squeezing prongs on the carrier arranged for action on the casing to form links, means operative on said prongs to progressively increase the squeezing action thereof on the casing, twisters operative on the links, and facings applied to said prongs and having friction surfaces.

11. The combination with a carrier for a filled sausage casing, of longitudinally spaced pairs of squeezing prongs on the carrier arranged for action on the casing to form links, cams operative on said prongs to progressively increase the squeezing action thereof on the casing, twisters operative on the links, and friction rollers on the prongs engageable with said cams and free to move longitudinally on said prongs.

12. In a machine of the kind described, the combination with a carrier comprising an endless belt, guide wheels for the belt, and holders on the belt for the filled sausage casing, of longitudinally spaced squeezers on the belt for action on the casing to form links, means for operating the squeezers, twisters operative on the links, and guards on certain of said holders for rendering the twisters inoperative on alternate links.

13. The construction defined in claim 12 in further combination with means for feeding the casing to said holders.

In testimony whereof I affix my signature.

CARL S. ZDECHLIK.